(12) United States Patent
Lauk et al.

(10) Patent No.: US 6,555,664 B1
(45) Date of Patent: Apr. 29, 2003

(54) PHTHALIMIDYL AZO PIGMENTS, METHOD FOR PRODUCING SAME AND UTILISATION THEREOF

(75) Inventors: Urs Lauk, Zürich (CH); Antoine Clément, Basel (CH); Romeo Dreier, Fehren (CH); Alfons Arquint, Basel (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/869,503

(22) PCT Filed: Dec. 27, 1999

(86) PCT No.: PCT/EP99/10396
§ 371 (c)(1),
(2), (4) Date: Jun. 28, 2001

(87) PCT Pub. No.: WO00/40656
PCT Pub. Date: Jul. 13, 2000

(30) Foreign Application Priority Data
Dec. 31, 1998 (EP) .............................. 98124859

(51) Int. Cl.$^7$ ....................... C09B 29/036; C09B 29/09; D06P 1/18; D06P 3/54
(52) U.S. Cl. ................. 534/789; 8/696; 8/922
(58) Field of Search ........................ 534/789

(56) References Cited

U.S. PATENT DOCUMENTS

| | | | | | |
|---|---|---|---|---|---|
| 3,980,634 A | * | 9/1976 | Weaver | ............... | 534/789 |
| 5,218,095 A | * | 6/1993 | Trottmann | ............... | 534/789 |
| 5,723,587 A | * | 3/1998 | Clement et al. | ............... | 534/854 |
| 6,008,332 A | * | 12/1999 | Herzig et al. | ............... | 534/789 |

FOREIGN PATENT DOCUMENTS

| | | | |
|---|---|---|---|
| EP | 443984 | * | 8/1991 |
| EP | 623654 | * | 11/1994 |
| EP | 667376 | * | 8/1995 |
| JP | 51-029577 | * | 3/1976 |

OTHER PUBLICATIONS

Chem. Abstr. vol. 85, No. 8, 48260s, (1976) for JP 51029577.

* cited by examiner

Primary Examiner—Fiona T. Powers
(74) Attorney, Agent, or Firm—Kevin T. Mansfield

(57) ABSTRACT

The present invention relates to dyes of formula

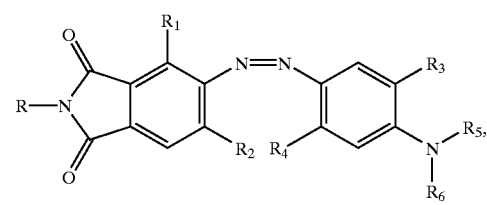

(1)

wherein

R is methyl or butyl, $R_1$ is hydrogen, halogen, cyano or nitro, $R_2$ is halogen or cyano, $R_3$ is hydrogen, halogen, $C_1$–$C_4$alkyl or $C_1$–$C_4$alkoxy, $R_4$ is hydrogen, $C_1$–$C_4$alkyl, halogen, $CF_3$ or —$NHCOR_7$ wherein $R_7$ is $C_1$–$C_4$alkyl, $R_5$ is $C_1$–$C_6$alkyl that is unsubstituted or substituted by hydroxy, cyano, acyloxy,

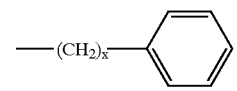

or by phenoxy, x being a number from 0 to 4 and it being possible for the alkyl chain, from $C_2$ upwards, optionally to be interrupted by one or more oxygen atoms, or is a radical of formula —$CH_2CH_2$—O—$COR_8$, of formula

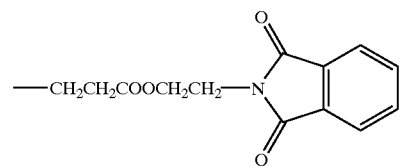

or of formula

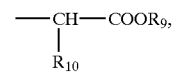

and $R_6$ is a radical of formula —$CH_2CH_2$—O—$COR_8$ or of formula

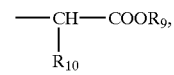

$R_8$ and $R_9$ each independently of the other being $C_1$–$C_4$alkyl and $R_{10}$ being hydrogen or $C_1$–$C_4$alkyl, or, when R is methyl, $R_5$ and $R_6$ are each independently of the other $C_1$–$C_4$alkyl, with the proviso that when R is n-butyl and $R_5$ and/or $R_6$ is/are a radical of formula —$CH_2CH_2$—O—$COR_8$, $R_4$ may not be chlorine or acetylamino, and also to the process for the preparation thereof and to the use thereof in dyeing or printing fibre materials, especially polyester-containing textile materials.

18 Claims, No Drawings

PHTHALIMIDYL AZO PIGMENTS, METHOD FOR PRODUCING SAME AND UTILISATION THEREOF

The present invention relates to disperse dyes having an N-alkyl-phthalimide-diazo component and an aniline coupling component, to processes for the preparation of such dyes and to the use thereof in dyeing or printing fibre materials, especially polyester-containing fibre materials.

Disperse azo dyes having an N-alkyl-phthalimide-diazo component and an aniline coupling component have been known for a long time and are used in dyeing hydrophobic fibre materials. It has, however, been found that the dyeings or prints obtained using the currently known dyes do not in all cases satisfy today's requirements, especially in respect of fastness to washing and fastness to perspiration. There is therefore a need for new dyes that especially have good washing fastness properties.

It has now been found, surprisingly, that the dyes according to the invention meet the criteria given above to a considerable degree.

The present invention accordingly relates to disperse dyes that yield dyeings having a high degree of fastness to washing and to perspiration and that, in addition, have good build-up characteristics both in the exhaust and thermosol process and in textile printing. The dyes are also suitable for discharge printing.

The dyes according to the invention correspond to formula

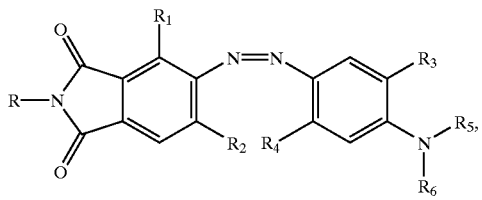

(1)

wherein
R is methyl or butyl,
$R_1$ is hydrogen, halogen, cyano or nitro,
$R_2$ is halogen or cyano,
$R_3$ is hydrogen, halogen, $C_1$–$C_4$alkyl or $C_1$–$C_4$alkoxy,
$R_4$ is hydrogen, $C_1$–$C_4$alkyl, halogen, $CF_3$ or —$NHCOR_7$ wherein $R_7$ is $C_1$–$C_4$alkyl,
$R_5$ is $C_1$–$C_6$alkyl that is unsubstituted or substituted by hydroxy, cyano, acyloxy,

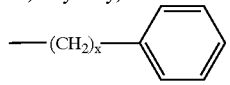

or by phenoxy, x being a number from 0 to 4 and it being possible for the alkyl chain, from $C_2$ upwards, optionally to be interrupted by one or more oxygen atoms, or is a radical of formula —$CH_2CH_2$—O—$COR_8$ or of formula

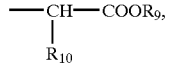

and $R_6$ is a radical of formula —$CH_2CH_2$—O—$COR_8$, of formula

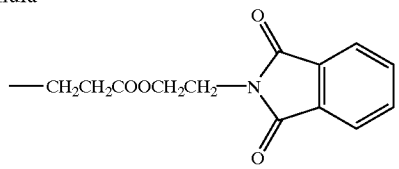

or of formula

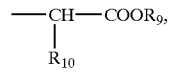

$R_8$ and $R_9$ each independently of the other being $C_1$–$C_4$alkyl and $R_{10}$ being hydrogen or $C_1$–$C_4$alkyl, or, when R is methyl, $R_5$ and $R_6$ are each independently of the other $C_1$–$C_4$alkyl, with the proviso that when R is n-butyl and $R_5$ and/or $R_6$ is/are a radical of formula —$CH_2CH_2$—O—$COR_8$, $R_4$ may not be chlorine or acetylamino.

R as butyl is n-butyl, iso-butyl, sec-butyl or tert-butyl.

Importance is given to R as methyl or n-butyl, especially methyl.

$R_1$ and $R_2$ as halogen are, each independently of the other, for example, fluorine, chlorine or bromine, especially chlorine or bromine, more especially bromine.

$R_3$ and $R_4$ as halogen are, each independently of the other, for example, fluorine, chlorine or bromine, especially chlorine or bromine, more especially chlorine.

$R_3$, $R_4$, $R_5$, $R_6$, $R_7$, $R_8$, $R_9$ and $R_{10}$ as $C_1$–$C_4$alkyl are, each independently of the others, methyl, ethyl, n-propyl, iso-propyl, n-butyl, iso-butyl, sec-butyl or tert-butyl, with the following preferences:

As $R_3$, preference is given to ethyl or, especially, methyl.
As $R_4$, preference is given to ethyl or, especially, methyl.
As $R_5$, preference is given to methyl or, especially, ethyl.
As $R_6$; preference is given to propyl and, especially, ethyl.
As $R_7$, preference is given to ethyl or, especially, methyl.
As $R_8$, preference is given to ethyl or, especially, methyl.
As $R_9$, preference is given to methyl and, especially, ethyl.
As $R_{10}$, preference is given to methyl.

$R_3$ as $C_1$–$C_4$alkoxy is, for example, methoxy, ethoxy, straight-chain or branched propoxy or straight-chain or branched butoxy. Preference is given to ethoxy or, especially, methoxy. A suitable acyloxy substituent in $R_5$ is, especially, propionyloxy or, more especially, acetoxy.

In the meaning of x preference is given to 2 or, especially, 1.

$R_5$ as substituted $C_1$–$C_6$alkyl is especially cyano-substituted $C_1$–$C_4$alkyl, more especially cyanoethyl.

As $R_1$, special preference is given to hydrogen, bromine or cyano, especially hydrogen or bromine.

As $R_2$, special preference is given to bromine or cyano, especially bromine.

As $R_3$, special preference is given to hydrogen.

As $R_4$, special preference is given to hydrogen or —$NHCOR_7$, the definition and preferred meanings given above applying to $R_7$.

As $R_4$, very special preference is given to —$NHCOR_7$, the definition and preferred meanings given above applying to $R_7$.

As $R_5$, special preference is given to ethyl or cyanoethyl.
As $R_6$, special preference is given to ethyl or, especially, to the radical —$CH_2CH_2OCOCH_3$.

As $R_6$, special preference is likewise given to the radical

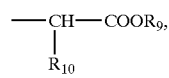

the definitions and preferred meanings given above applying to $R_9$ and $R_{10}$.

As $R_6$, very special preference is given to the radical —$CH(CH_3)$—$COOC_2H_5$.

Special preference is given to dyes of formulae

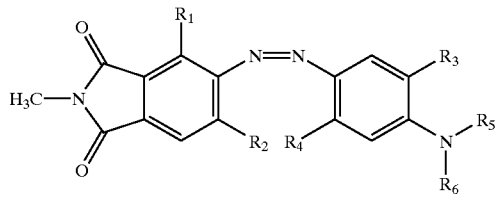

| No. | $R_1$ | $R_2$ | $R_3$ | $R_4$ | $R_5$ | $R_6$ |
|---|---|---|---|---|---|---|
| 100 | —H | —Br | —H | —NHCOCH$_3$ | —C$_2$H$_5$ | —CH(CH$_3$)COOC$_2$H$_5$ |
| 101 | —H | —Br | —H | —NHCOC$_2$H$_5$ | —C$_2$H$_5$ | —CH$_2$COOCH$_3$ |
| 102 | —H | —Br | —H | —NHCOCH$_3$ | —C$_2$H$_5$ | —CH$_2$COOC$_2$H$_5$ |
| 103 | —H | —Br | —H | —NHCOC$_2$H$_5$ | —C$_2$H$_5$ | —CH(CH$_3$)COOCH$_3$ |
| 104 | —H | —Br | —H | —NHCOCH$_3$ | —C$_2$H$_5$ | —CH$_2$COOCH$_3$ |
| 105 | —H | —Br | —H | —NHCOC$_2$H$_5$ | —C$_2$H$_5$ | —CH$_2$COOC$_2$H$_5$ |
| 106 | —H | —Br | —H | —NHCOCH$_3$ | —C$_2$H$_5$ | —CH(CH$_3$)COOCH$_3$ |
| 107 | —H | —Br | —H | —NHCOC$_2$H$_5$ | —C$_2$H$_5$ | —CH(CH$_3$)COOC$_2$H$_5$ |
| 108 | —H | —Br | —H | —NHCOCH$_3$ | —CH$_2$—C$_6$H$_5$ | —CH$_2$COOCH$_3$ |
| 109 | —H | —Br | —H | —NHCOCH$_3$ | —CH$_2$CH$_2$CN | —CH$_2$COOC$_2$H$_5$ |
| 110 | —H | —Br | —H | —H | —CH$_2$CH$_2$CN | —CH$_2$CH$_2$OCOCH$_3$ |
| 111 | —H | —NO$_2$ | —H | —NHCOCH$_3$ | —C$_2$H$_5$ | —CH$_2$COOCH$_3$ |
| 112 | —Br | —NO$_2$ | —H | —NHCOCH$_3$ | —C$_2$H$_5$ | —CH$_2$COOCH$_3$ |
| 113 | —CN | —NO$_2$ | —H | —NHCOCH$_3$ | —C$_2$H$_5$ | —CH(CH$_3$)COOC$_2$H$_5$ |
| 114 | —H | —Br | —H | —NHCOCH$_3$ | —CH$_2$COOCH$_3$ | —CH(CH$_3$)COOC$_2$H$_5$ |
| 115 | —H | —Br | —H | —NHCOCH$_3$ | —CH$_2$COOC$_2$H$_5$ | —CH(CH$_3$)COOCH$_3$ |
| 116 | —H | —Br | —OCH$_3$ | —NHCOCH$_3$ | —C$_2$H$_5$ | —CH(CH$_3$)COOC$_2$H$_5$ |
| 117 | —H | —CN | —H | —NHCOCH$_3$ | —C$_2$H$_5$ | —CH(CH$_3$)COOC$_2$H$_5$ |
| 118 | —H | —CN | —H | —NHCOCH$_3$ | —C$_2$H$_5$ | —CH(CH$_3$)COOCH$_3$ |
| 119 | —H | —Br | —Cl | —NHCOCH$_3$ | —C$_2$H$_5$ | —CH(CH$_3$)COOC$_2$H$_5$ |
| 120 | —CN | —CN | —H | —NHCOCH$_3$ | —CH$_2$COOCH$_3$ | —CH(CH$_3$)COOC$_2$H$_5$ |
| 121 | —CN | —CN | —H | —NHCOCH$_3$ | —C$_2$H$_5$ | —CH(CH$_3$)COOC$_2$H$_5$ |
| 122 | —H | —CN | —H | —NHCOCH$_3$ | —CH$_2$COOCH$_3$ | —CH(CH$_3$)COOC$_2$H$_5$ |
| 123 | —Br | —Br | —H | —NHCOCH$_3$ | —C$_2$H$_5$ | —CH(CH$_3$)COOC$_2$H$_5$ |
| 124 | —Br | —Br | —H | —NHCOCH$_3$ | —C$_2$H$_5$ | —C$_2$H$_5$ |
| 125 | —H | —Cl | —H | —NHCOCH$_3$ | —C$_2$H$_5$ | —CH(CH$_3$)COOC$_2$H$_5$ |
| 126 | —H | —Br | —H | —NHCOCH$_3$ | —C$_2$H$_5$ | —CH$_2$CH$_2$COOCH$_3$ |

Special preference is likewise given to dyes of formulae

| No. | $R_4$ | $R_5$ | $R_6$ |
|---|---|---|---|
| 127 | —NHCOCH$_3$ | —C$_2$H$_5$ | CH$_2$CH$_2$COOCH$_2$CH$_2$—N(phthalimide) |
| 128 | —H | —CH$_3$ | CH$_2$CH$_2$COOCH$_2$CH$_2$—N(phthalimide) |

Special preference is likewise given to dyes of formulae

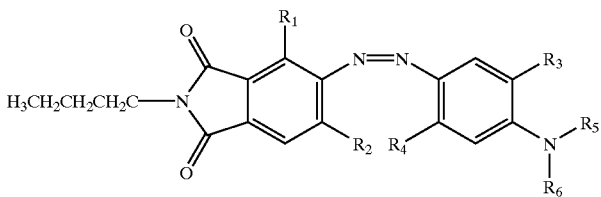

| No. | $R_1$ | $R_2$ | $R_3$ | $R_4$ | $R_5$ | $R_6$ |
|---|---|---|---|---|---|---|
| 129 | —H | —Br | —H | —NHCOCH$_3$ | —C$_2$H$_5$ | —CH(CH$_3$)COOC$_2$H$_5$ |
| 130 | —H | —Br | —H | —H | —C$_2$H$_5$ | —CH$_2$CH$_2$OCOCH$_3$ |
| 131 | —H | —Br | —H | —H | —C$_2$H$_5$ | —CH$_2$CH$_2$CN |
| 132 | —H | —Br | —H | —H | —CH$_2$CH$_2$CN | —CH$_2$CH$_2$OCOCH$_3$ |
| 133 | —H | —Br | —H | —H | —C$_2$H$_5$ | —CH$_2$COOCH$_3$ |
| 134 | —H | —Br | —H | —H | —C$_2$H$_5$ | —CH$_2$COOC$_2$H$_5$ |
| 135 | —H | —Br | —H | —H | —C$_2$H$_5$ | —CH(CH$_3$)COOC$_2$H$_5$ |
| 136 | —H | —Br | —H | —H | —C$_2$H$_5$ | —CH(CH$_3$)COOCH$_3$ |
| 137 | —H | —Br | —H | —H | —CH$_2$CH$_2$CN | —CH$_2$—C$_6$H$_5$ |
| 138 | —H | —Br | —H | —H | —CH$_2$CH$_2$CN | —CH$_2$CH$_2$CN |
| 139 | —H | —Br | —H | —H | —CH$_2$CH$_2$OCOCH$_3$ | —CH$_2$CH$_2$OCOCH$_3$ |
| 140 | —H | —CN | —H | —NHCOCH(CH$_3$)$_2$ | —C$_2$H$_5$ | —CH$_2$COOC$_2$H$_5$ |
| 141 | —H | —Br | —H | —NHCOCH$_3$ | —C$_2$H$_5$ | —CH(CH$_3$)COOCH$_3$ |

Very special preference is given to dyes of formulae

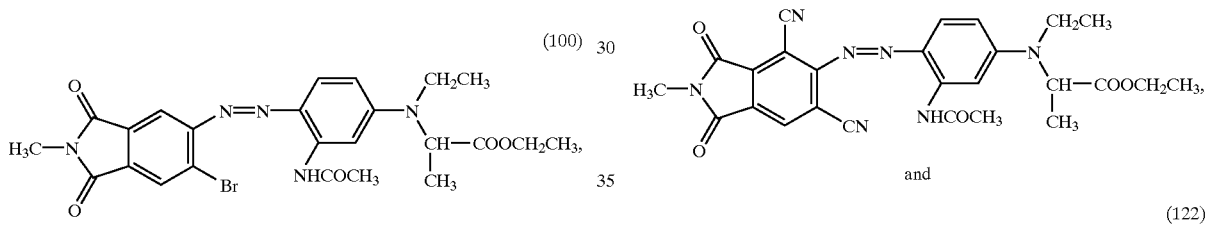

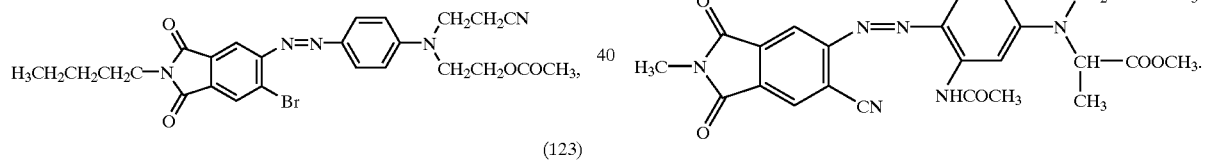

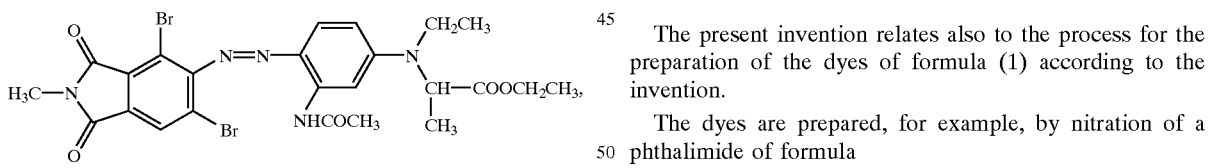

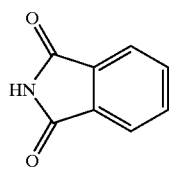

The present invention relates also to the process for the preparation of the dyes of formula (1) according to the invention.

The dyes are prepared, for example, by nitration of a phthalimide of formula

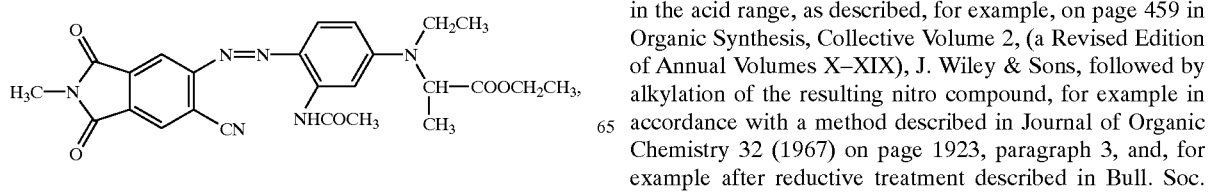

in the acid range, as described, for example, on page 459 in Organic Synthesis, Collective Volume 2, (a Revised Edition of Annual Volumes X–XIX), J. Wiley & Sons, followed by alkylation of the resulting nitro compound, for example in accordance with a method described in Journal of Organic Chemistry 32 (1967) on page 1923, paragraph 3, and, for example after reductive treatment described in Bull. Soc.

Chim. de France 1957 on page 569, conversion into an intermediate of formula

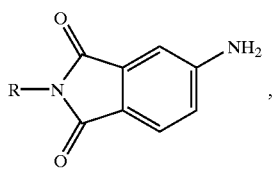
(51)

wherein R has the definition and preferred meanings given above.

Using generally known methods, the intermediate of formula (51) is, in an acid medium, nitrated or mono- or poly-halogenated—it being possible, if desired, for the halogen substituents to be replaced by cyano using methods that are also generally known—and then diazotised and coupled to a compound of formula

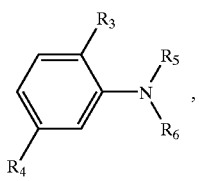
(52)

wherein $R_3$, $R_4$, $R_5$ and $R_6$ have the definitions and preferred meanings given above.

The halogenation is carried out, for example, by reacting the compound of formula (51) first with sodium acetate in acetic acid and then with bromine in the same medium to form the corresponding mono- or di-bromo compound.

The diazotisation of the compound of formula (51) is likewise carried out in a manner known per se, for example with sodium nitrite in an acidic, for example hydrochloric acid-containing or sulfuric acid-containing, aqueous medium. The diazotisation may, however, also be carried out using other diazotisation agents, e.g. with nitrosylsulfuric acid. In the diazotisation, an additional acid may be present in the reaction medium, e.g. phosphoric acid, sulfuric acid, acetic acid, propionic acid, hydrochloric acid or mixtures of such acids, e.g. mixtures of propionic acid and acetic acid. The diazotisation is advantageously carried out at temperatures of from −10 to 30° C., for example from −10° C. to room temperature.

The coupling of the diazotised compound of formula (51) to the coupling component of formula (52) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The diazo components of formula (51) and the coupling components of formula (52) are known or can be prepared in a manner known per se.

The dyes according to the invention may be used as dyes for dyeing and printing semi-synthetic and especially synthetic hydrophobic fibre materials, especially textile materials. Textile materials composed of blend fabrics that comprise such semi-synthetic or synthetic hydrophobic fibre materials can also be dyed or printed using the compounds according to the invention.

Semi-synthetic fibre materials that come into consideration are, especially, cellulose 2½-acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride and on polyamide.

The application of the compounds according to the invention to the fibre materials is effected in accordance with known dyeing methods. For example, polyester fibre materials are dyed in the exhaust process from an aqueous dispersion in the presence of customary anionic or non-ionic dispersants and, optionally, customary swelling agents (carriers) at temperatures of from 80 to 140° C. Cellulose 2½-acetate is dyed preferably at from 65 to 85° C. and cellulose triacetate at temperatures of from 65 to 115° C.

The dyes according to the invention will not stain wool and cotton present at the same time in the dyebath or will stain such materials only slightly (very good reservation) so that they can also be used satisfactorily in the dyeing of polyester/wool and polyester/cellulose fibre blend fabrics.

The dyes according to the invention are suitable for dyeing in accordance with the thermosol process, in the exhaust process and for printing processes.

In such processes, the said fibre materials can be in a variety of processing forms, e.g. in the form of fibres, yarns or nonwoven, woven or knitted fabrics.

It is advantageous to convert the dyes according to the invention into a dye preparation prior to use. For this purpose, the dye is ground so that its particle size is on average from 0.1 to 10 microns. Grinding can be carried out in the presence of dispersants. For example, the dried dye is ground together with a dispersant or kneaded into a paste form together with a dispersant and then dried in vacuo or by atomisation. After adding water, the resulting preparations can be used to prepare dye pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes according to the invention impart to the said materials, especially to polyester materials, level colour shades having very good in-use fastness properties such as, especially, good fastness to light, fastness to heat setting, fastness to pleating, fastness to chlorine, and wet fastness, e.g. fastness to water, to perspiration and to washing; the dyeings are further characterised by very good fastness to rubbing. Special emphasis should be given to the good fastness properties of the dyeings obtained with respect to perspiration and, especially, to washing.

The dyes according to the invention can also be used satisfactorily in producing mixed shades together with other dyes.

Furthermore, the dyes according to the invention are also well suited to dyeing hydrophobic fibre materials from supercritical $CO_2$.

The present invention relates to the above-mentioned use of the dyes according to the invention as well as to a process for the dyeing or printing of semi-synthetic or synthetic hydrophobic fibre materials, especially textile materials, in which process a dye according to the invention is applied to the said materials or incorporated into them. The said hydrophobic fibre materials are preferably textile polyester materials. Further substrates that can be treated by the process according to the invention and preferred process conditions can be found above in the more detailed description of the use of the dyes according to the invention.

The invention relates also to the hydrophobic fibre materials, preferably polyester textile materials, dyed or printed by the said process. The dyes according to the invention are, in addition, suitable for modern reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimeters.

EXAMPLE 1

105.00 g of glacial acetic acid are introduced into a laboratory reaction apparatus and, over the course of 3 minutes, 5.24 g of the compound of formula

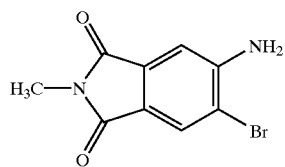

(53)

are introduced at room temperature. The resulting greenish suspension is stirred for 5 minutes and then, over the course of 7 minutes, 1.96 g of 98% sulfuric acid are added; stirring is carried out for 10 minutes. Then, over the course of 20 minutes, with cooling at 15–20° C., 6.50 g of 40% nitrosylsulfuric acid are added dropwise to the reaction mixture and stirring is carried out for 1 hour at that temperature. After the reaction is complete, 8.00 g of ice-water are added, over the course of 10 minutes, to the mixture, which is then added dropwise, over the course of 40 minutes, to a mixture consisting of 25.20 g of glacial acetic acid, 2.32 g of 32% hydrochloric acid, 80.00 g of ice-water and 20.60 g of a 31.1% aqueous solution of the compound of formula

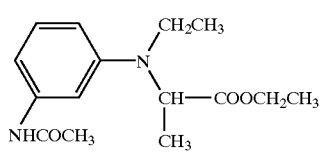

(54)

at a pH of about 2.5 and a temperature of 0–5° C., and stirred for 40 minutes. Then, over the course of 40 minutes, 29.00 g of 15% aqueous sodium hydroxide solution are added dropwise at a temperature of 0–5° C., the mixture is adjusted to a pH of 1.0 and stirring is subsequently carried out for 15 minutes.

The resulting red suspension is filtered with suction; washing is carried out using 250 g of deionised water until the pH is >5 and drying is carried out.

There are obtained 9.83 g of the dye of formula

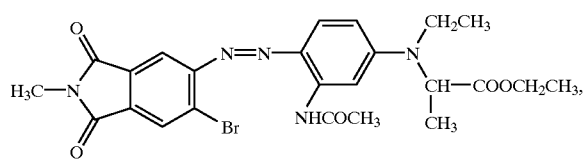

(100)

which dyes polyester a brilliant red shade.

EXAMPLE 2

26.25 9 of glacial acetic acid are introduced into a laboratory reaction apparatus and, over the course of 3 minutes, 1.67 g of the compound of formula

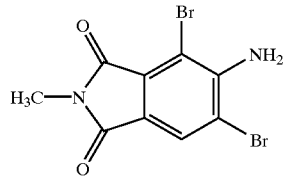

(53)

are introduced at room temperature. The resulting greenish suspension is stirred for 5 minutes and then, over the course of 7 minutes, 0.54 g of 98% sulfuric acid is added; stirring is carried out for 10 minutes. Then, over the course of 20 minutes, with cooling at 15–20° C., 1.86 g of 40% nitrosylsulfuric acid are added dropwise to the reaction mixture and stirring is carried out for 1 hour at that temperature. After the reaction is complete, the mixture is then added dropwise, over the course of 10 minutes, to a mixture consisting of 6.30 g of glacial acetic acid, 0.58 g of 32% hydrochloric acid, 11.00 g of ice-water and 5.20 g of a 31.1% aqueous solution of the compound of formula (54) at a temperature of 0–5° C. and stirred for 120 minutes. Then, over the course of 10 minutes, 15.00 g of ice-water are added dropwise; the resulting red suspension is filtered with suction; washing with deionised water and drying are carried out.

There are obtained 2.10 g of the dye of formula

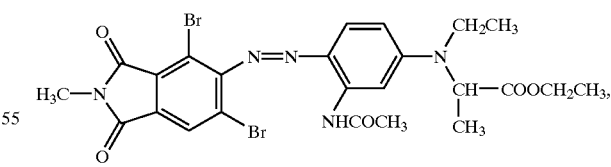

(123)

which dyes polyester a reddish-brown shade.

EXAMPLE 3

22.00 g of ice are introduced into a laboratory reaction apparatus and, with cooling, 129.47 g of 98% sulfuric acid are added. Then, over the course of 15 minutes, 43.40 g of the compound of formula

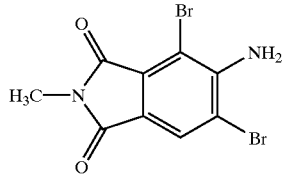
(53)

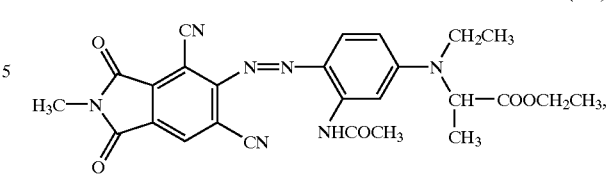
(121)

which dyes polyester a blue shade.

EXAMPLE 5

1 part by weight of the dye of formula

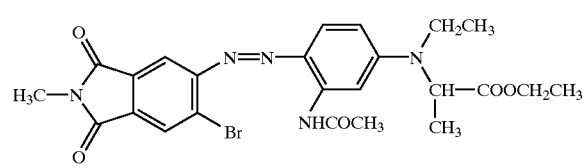
(100)

are introduced at room temperature and the resulting yellowish-brown solution is subsequently stirred for 10 minutes. Then, over the course of 50 minutes, 1.86 g of 40% nitrosylsulfuric acid are added dropwise to the reaction mixture, with cooling to a temperature of 16–18° C., and stirring is carried out for 2 hours at that temperature. Then, after the reaction is complete, the mixture is added dropwise, over the course of 25 minutes, to a mixture consisting of 105 g of 100% acetic acid, 157.50 g of glacial acetic acid, 35.00 g of 3-diethylaminoacetanilide and 200 g of ice at a temperature of 0–5° C. and stirred for 30 minutes. Then, over the course of 30 minutes, 260 ml of 30% aqueous sodium hydroxide solution are added dropwise and the reaction mass is adjusted to a pH of 1.5. Then 600 g of ice are added in portions; stirring is subsequently carried out for 20 minutes and the resulting red suspension is filtered with suction; washing with deionised water until the pH is >4 and drying at 60° C. are carried out.

There are obtained 62.00 g of the dye of formula

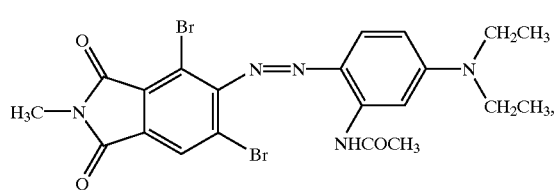
(124)

which dyes polyester a reddish-brown shade.

EXAMPLE 4

1.24 g of the dye of formula (123) of Example 2 and 10 ml of dimethyl sulfoxide are introduced into a laboratory reaction apparatus and stirred for 10 minutes at room temperature. Then, over the course of 10 minutes, 0.10 g of sodium cyanide and 0.36 g of copper(l) cyanide are introduced and the mixture is stirred for 60 minutes. Then, over the course of 10 minutes, a further 0.10 g of sodium cyanide and 0.36 g of copper(l) cyanide are added and stirring is carried out for 10 minutes; the temperature is then increased to 50° C. over the course of 4 minutes. The reaction mixture is stirred for 5 minutes at that temperature and then cooled to room temperature; 2.00 g of water are added over the course of 10 minutes and stirring is carried out for a further 30 minutes. The suspension is then filtered with suction, and washing with warm water (50° C.) and drying are carried out. There is obtained 0.80 g of the dye of formula is ground in a sand mill, together with 17 parts by weight of water and 2 parts by weight of a commercially available dispersant of the dinaphthylmethanedisulfonate type, and converted into a 5% aqueous dispersion.

Using that formulation, a 1% dyeing (based on the dye and the substrate) is produced on woven polyester fabric by the high-temperature exhaust process at 130° C. and is cleaned reductively. The dyeing obtained in that manner has very good in-use fastness properties, especially excellent fastness to washing.

The same good fastness properties can be achieved when woven polyester fabric is dyed in the thermosol process (10 g/liter of dye, liquor pick-up 50%, fixing temperature 210° C.).

What is claimed is:
1. A dye of formula

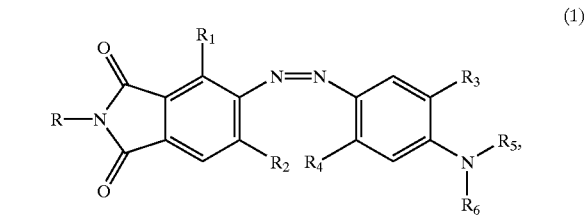
(1)

wherein

R is methyl or butyl, $R_1$ is hydrogen or bromine, $R_2$ is bromine, $R_3$ is hydrogen, halogen, $C_1$–$C_4$alkyl or $C_1$–$C_4$alkoxy, $R_4$ is —NHCOR$_7$ wherein $R_7$ is methyl or ethyl, $R_5$ is ethyl or cyanoethyl, and $R_6$ is a radical of formula —CH$_2$CH$_2$—O—COR$_8$ or of formula

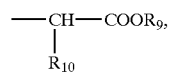

$R_8$ and $R_9$ each independently of the other being $C_1$–$C_4$alkyl and $R_{10}$ being hydrogen or $C_1$–$C_4$alkyl, or, when R is methyl, $R_5$ and $R_6$ are each independently of the other $C_1$–$C_4$alkyl.

2. A dye according to claim 1, wherein $R_6$ is the radical of formula

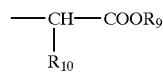

wherein $R_9$ is $C_1$–$C_4$alkyl and $R_{10}$ is hydrogen or $C_1$–$C_4$alkyl.

3. A dye according to claim 2, wherein $R_6$ is the radical —CH(CH$_3$)COOC$_2$H$_5$.

4. Dye according to claim 1, of formula

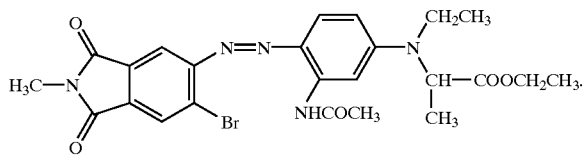
(100)

5. Dye according to claim 1, of formula

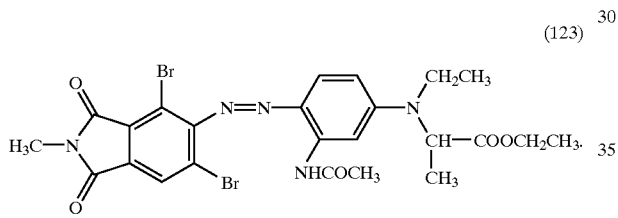
(123)

6. Dye according to claim 1, of formula

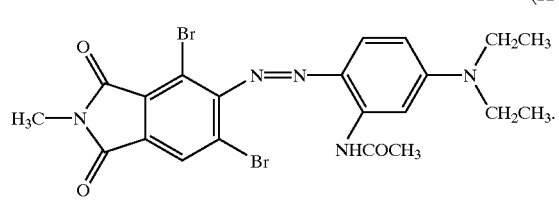
(124)

7. A process for the preparation of a dye of formula (1) according to claim 1, in which process a phthalimide of formula

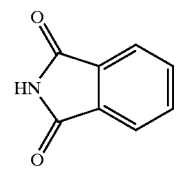
(50)

is nitrated in the acid range, the resulting nitro compound is then alkylated and, by means of reductive treatment, converted into an intermediate of formula

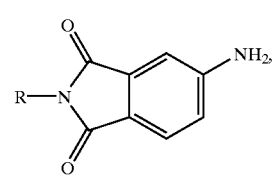
(51)

and the intermediate of formula (51) is, in an acid medium, mono- or di-brominated, and then diazotised and coupled to a compound of formula

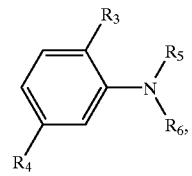
(52)

wherein R, $R_3$, $R_4$, $R_5$ and $R_6$ are as defined for formula (1) in claim 1.

8. A process for dyeing or printing semi-synthetic or synthetic hydrophobic fibre materials in which process a dye of formula (1) according to claim 1 is applied to the said materials or incorporated into them.

9. A process according to claim 8, which comprises dyeing or printing polyester-containing textile fibre materials.

10. A hydrophobic fibre material which is dyed or printed by the method according to claim 8.

11. The dye of formula

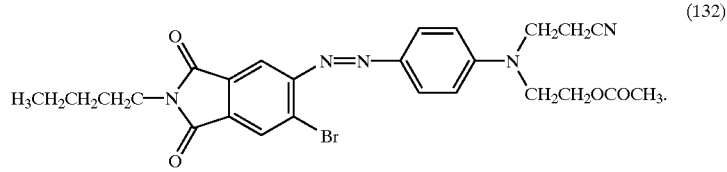
(132)

12. A dye of formula

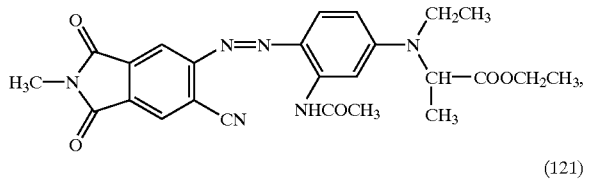

(117)

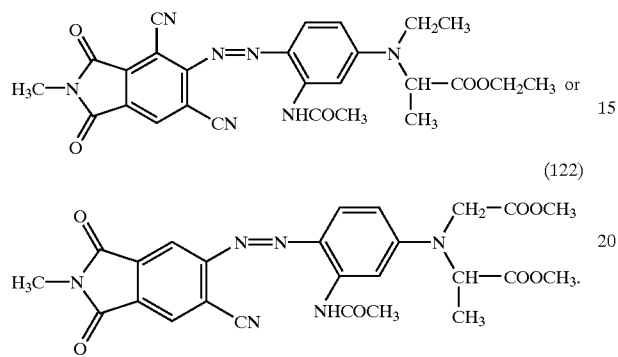

(121)

(122)

13. Dye according to claim 12, of formula

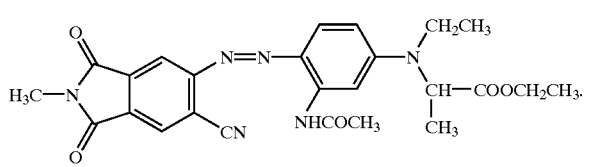

(117)

14. Dye according to claim 12, of formula

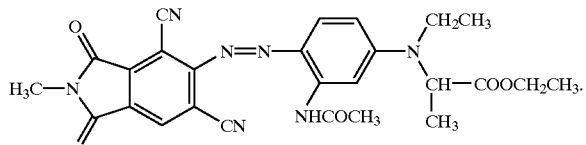

(121)

15. Dye according to claim 12, of formula

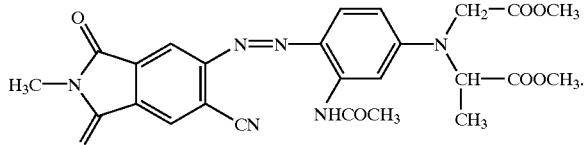

(122)

16. A process for dyeing or printing semi-synthetic or synthetic hydrophobic fibre materials, in which process a dye of formula (117), (121) or (122) according to claim 12 is applied to the said incorporated into them.

17. A process according to claim 16, which comprises dyeing or printing polyester-containing textile fibre materials.

18. A hydrophobic fibre material which is dyed or printed by the method according to claim 16.

* * * * *